Nov. 26, 1957 F. A. STALLWORTHY ET AL 2,814,674

TELEPHONE TRUNK SUPERVISORY SIGNALLING SYSTEM

Filed Nov. 23, 1954 3 Sheets-Sheet 1

Inventors
FRANK ALLEN STALLWORTHY
PERCY WILLIAM HICKS
By [signature]
Attorney

TELEPHONE TRUNK SUPERVISORY SIGNALLING SYSTEM

Filed Nov. 23, 1954 3 Sheets-Sheet 2

Inventors
FRANK ALLEN STALLWORTHY
PERCY WILLIAM HICKS
By
Robert B. [signature]
Attorney Inventors
FRANK ALLEN STALLWORTHY
PERCY WILLIAM HICKS
By
Robert B. Pearson
Attorney United States Patent Office 2,814,674

Patented Nov. 26, 1957

2,814,674

TELEPHONE TRUNK SUPERVISORY SIGNALLING SYSTEM

Frank Allen Stallworthy, Bexley Heath, and Percy William Hicks, Dartford, England, assignors to Siemens Edison Swan Limited, a corporation of Great Britain Application November 23, 1954, Serial No. 470,722

5 Claims. (Cl. 179—27)

Figure 1:
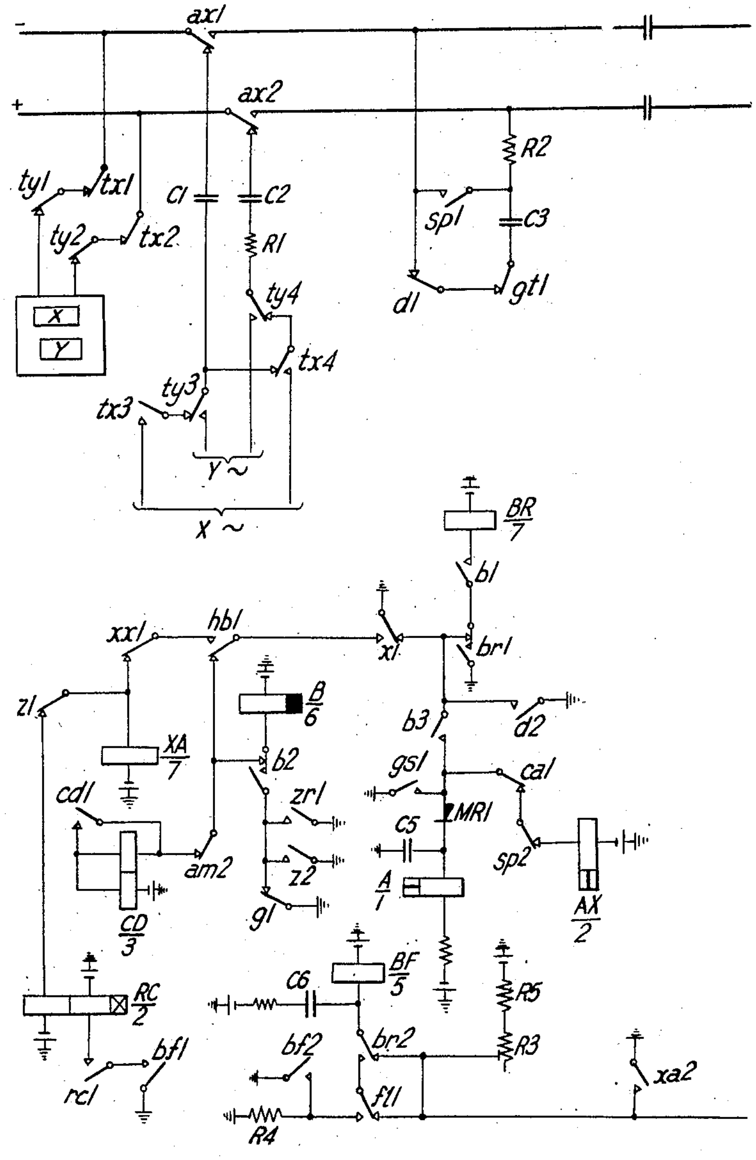

This invention relates to telephone systems and more particularly to supervisory signalling over a trunk line between exchanges. Generally speaking, two kinds of supervisory signalling are known. In the first, a signal signifying a particular condition is transmitted so long as the condition exists, the reception of the signal bringing about an indication the persistence of which is dependent on the continued receipt of the signal. In the second kind, a momentary signal is transmitted when a condition commences to obtain and another momentary signal is transmitted when the condition ceases to obtain, the signal receiving circuits being locked up on receipt of the first momentary signal to maintain the signal indication and unlocked on receipt of the second momentary signal to remove the signal indication. The known method of signalling by voice frequency currents usually makes use of the second kind of signalling mentioned to avoid the necessity of transmitting speech and signalling currents simultaneously.

Further, in the case of voice frequency supervisory signals it is usual in order to overcome difficulties due to the accidental effect of speech or other transients on the signals, to precede the actual operative signal by a prefix. In one known type of system a signal has a two-part character, the first part overcoming a guard delay period provided at the receiving point and the second part which is coterminous with the first part being the significant part which gives effect to the signal. If such a signal is of short duration its reception may be prevented by speech or transients on the line and in a particular system the signal has been repeated until it has taken effect at the receiving point, its transmission being terminated by receipt at the transmitting point of an acknowledgment signal from the receiving point.

A difficulty that the present invention seeks to overcome concerns the transmission of a series of short signals. A series of short signals may be required to cause a supervisory lamp to flicker or flash and the series is for this reason frequently referred to as a lamp flashing signal. In a system using the second kind of signalling above mentioned the rapidity with which a lamp can be caused to flash is limited by the times taken for a signal to be sent, recognised and acted on to cause the lamp to light and for another signal to be sent, recognised and acted on to cause the lamp to be extinguished.

According to one feature of the present invention, in a telephone system employing the second kind of voice frequency supervisory signalling mentioned it is arranged that receipt of a supervisory signal gives an indication of the significance of the signal so long as it persists and the indication given is locked up only if the signal persists beyond a predetermined time.

According to another feature of the invention in a telephone system employing the second kind of voice frequency supervisory signalling mentioned a supervisory signal comprises co-terminous parts differing in character, the receipt of one part of a signal giving an indication of its significance and the receipt of another part bringing about the locking up of the indication given.

The parts of the voice frequency signal are of different characters such as different frequencies. The first part may be looked upon as comprising a prefix part and a significant part, differentiation between these parts at the receiving point being on a time basis. At the end of the trunk from which the supervisory signals are to be transmitted it is convenient to arrange that the change of character of the supervisory signal is brought about by a timing device which operates to change the character of the signal if the condition which gave rise to the transmission of the signal persists for a predetermined time, this time being longer than the duration of a flash signal. At the end of the trunk at which the signal is received a timing device will be arranged to determine that the prefix part has persisted, that is, that the first part of the signal received is an actual signal and not a transient and, if it is the former to give an indication of the significance of the signal. If the second part of the signal, that is, the part of changed character is received the indication given will be maintained by a locking up of the indicating circuit. For a flashing signal only the first part comprising the prefix and significant parts will be transmitted since the second part is the part that brings about a locking up of the indicating circuit and in this case no lock up is required and consequently there is no need for an unlocking signal. The prefix is used to overcome the guarding function generally provided in voice frequency signalling systems to prevent false response of the voice frequency receiver to signal frequency currents in speech and transients causing unwanted circuit action external to the receiver and in the case of a flashing signal it may be arranged that the guarding function, having been overcome by the prefix of the first received flashing signal remains inoperative during the remainder of a train of flashing signals thereby enabling subsequent signals of the train to bring about a quicker response. Thus, a signal short enough to permit repetition of a flash may be had. In the known method of voice frequency signalling previously mentioned, pulses of .375 second duration as supervisory signals are repeated until they have taken effect. For flashing signals of shorter duration the time of pulse transmission and receipt of the acknowledgment signal will be excessive. Flashing signals may consist of pulses of .2 second duration at .3 second intervals so that the use of repeated supervisory signals as flashing signals will not be possible. If, for example, the locking part of a signal is prevented from being transmitted for, say, .9 second, flashing signals having a duration of less than .9 second may be repeated without lock up taking place. With the addition of the locking part of a signal a complete signal will extend for longer than .9 second and with a signal of this duration the use of an acknowledgment signal may be dispensed with in most cases. However, simple arrangements may be provided for the provision of an acknowledgment signal if it should be required. The timing of the durations of the several parts of a signal may conveniently be performed by slow acting relays or relays rendered slow acting by reason of their association with circuits having prescribed time constants.

Figure 2:
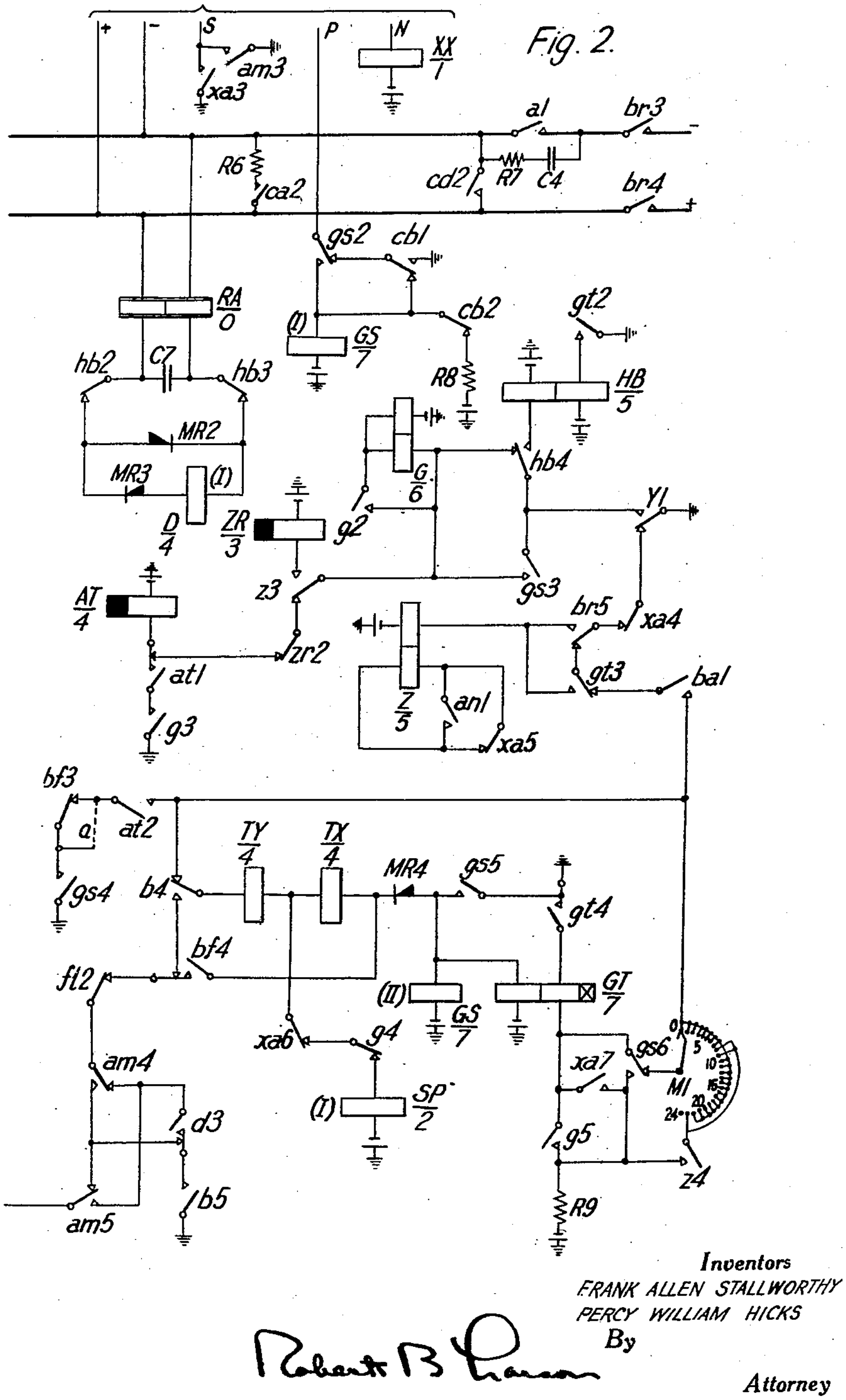

For a clearer understanding of the invention a specific embodiment will now be described by way of example with reference to the accompanying drawings. The drawings comprise three figures and show circuits terminating one end of a both-way trunk over which signals are passed as pulses of voice frequency current. Two frequencies are employed, one designated X frequency and the other Y frequency. Figs. 1 and 2 of the drawings should be assembled with Fig. 1 to the left of Fig. 2. The trunk is shown at the left of Fig. 1 and is connectible over condensers and relay contacts to line wires extending to the right of Fig. 2 which are to be assumed to be connected to a selector for incoming calls. The trunk circuit is also connectible to the banks of trunk selectors over wires shown at the top of Fig. 2, the wires being designated +, − for the line wires, *p* for the test wire, S for the supervisory wire and N for a wire the purpose of which will be explained later. To the trunk line wires is connected a voice frequency signal receiver including signal relays X and Y adapted to respond respectively to currents of X and Y frequency. It is to be understood that guarding arrangements will be incorporated in the voice frequency signal receiver in known manner to guard against operation of the signal relays by the occurrence of the frequencies to which they are to respond occurring in speech. The voice frequency signal receiver is normally connected to the trunk over back contacts of relays TX and TY which are pulse transmitting relays for the two frequencies respectively. Contacts of the signal receiving relays are designated *x*1 and *y*1 respectively. Of the relays shown, A is an impulse repeating relay, AX is a relay which connects the trunk to a source of signal current, or to a termination or to the trunk selector circuits, B is a slow releasing control relay, BA a slow releasing relay which connects earth to many of the circuits and acts a circuit guard relay, BR is an auxiliary to relay B, CD is a dialling relay operated on incoming calls, CA is an auxiliary relay to relay CD, D is an answering supervisory relay for incoming calls, and SP is a splitting relay the function of which is to bring about the disconnection of the trunk from the operating circuits to guard against interference with voice frequency signals by current surges due to the presence of the line condensers. Relay CB is a guard relay for outgoing trunk selectors. Relays GS, GT, HB are concerned only with outgoing calls and relays G, Z, ZR, RC, BF and FL are concerned with the timing of the several parts of a signal. Of these relays ZR is a slugged slow releasing relay, G and Z are relays that are made slow to release by means of a short circuited winding and relays RC and FL are slow operating relays. Relay BF is of high resistance and is shunted by condenser C6, the combination giving the relay a long release lag, of about .900 millisecond. Relays AT, AM and AN are concerned with the registration of voice frequency signals. Whenever relay SP operates it disconnects relay AX and when AX is released it connects up a termination consisting of condensers C1 and C2 and resistance R1 to the trunk with relays TX and TY unoperated and connects up sources of X and Y frequency current when relay TX or TY respectively is operated. Relays TX and TY on operation besides connecting up a source of voice frequency current disconnect the voice frequency signal receiver from the trunk at contacts *tx*1, *tx*2, *ty*1 and *ty*2. When the trunk is connected by the operation of relay AX a termination consisting of condenser C3 and resistance R2 is connected to it.

A voice frequency supervisory signal is transmitted as one or two parts according to whether it is a flashing signal or a signal that is to be locked up and is received as a two or three part signal, the first part of the signal being divided into two parts at the receiving point, the first part identifying the signal as such, the second part giving effect to the signal and the third part bringing about the locking action. The first part of a transmitted signal is of X frequency and is timed by the slow release of relay BF which has a release period of about 900 milliseconds and the release of the relay terminates the first part of the transmitted signal and begins the transmission of the second part which is of Y frequency. The termination of the second part of the signal is brought about by operation of slow operating relay FL following the release of relay BF. A flashing signal will not persist for the 900 millisecond lag of relay BF and that relay will remain held and the source of X frequency current will be disconnected during the quiescent period of the flash signal that gave rise to the transmission of the voice frequency signal, i. e. during the period when relay D is released. At the receiving end, the receipt of the X frequency signal will effect operation of relay XA and release of relay Z and operation of slow operating relay RC. Release of relay Z identifies the signal as such and brings about splitting of the trunk to disconnect it from the associated apparatus. Operation of relay XA brings about operation of relay BF, and relay RC when it operates locks the line splitting relay operated dependent on BF. If the signal is a flashing signal relay XA will release and initiate the release of relay BF and no lock up will take place and the line splitting relay will remain operated so that subsequent flash signals will be effective substantially immediately. If the signal is a steady signal X frequency current will persist for about 900 ms. after which Y frequency current will be received. When the X frequency current ceases relay XA will release and on receipt of the following Y frequency current relays G and AT operate. Operation of relay AT brings about the locking condition by the operation or release of relay AM according to whether the signal is an answering or clearing signal. It will thus be seen that relays RC and Z form a timing device for the identification of a signal and that relay BF forms another timing device to determine whether a change of condition is of a flashing nature or a steady nature. The precise operations that take place will be clear from the following detailed description of the circuit operations that take place when a call is made over the trunk.

Figure 3:
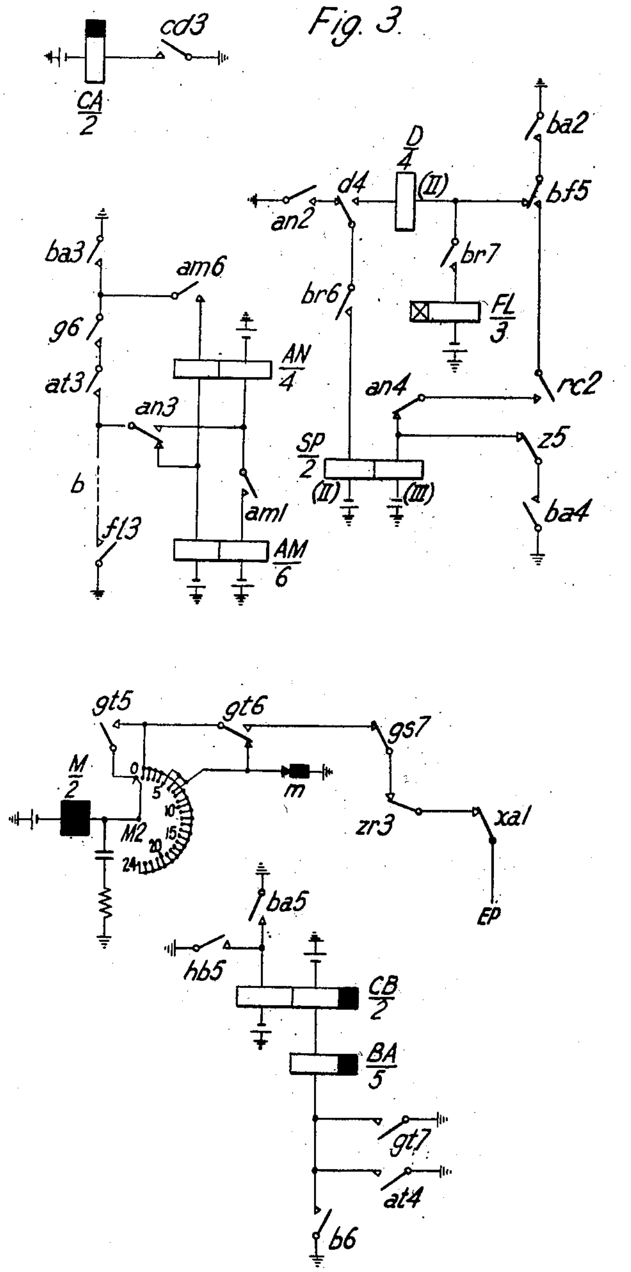

The operations that take place on a call incoming over the trunk will first be described. The trunk will be taken into use by the transmission thereof of a pulse of current of X frequency. The relay X in the voice frequency signal receiver responsive to this frequency operates and at contact *x*1 closes an operating circuit over contacts *hb*1 and *b*2 for relay B and over contacts *hb*1 and *am*2 for relay CD. Relay B operates and locks over contacts *b*2 and *g*1 and relay CD operates by the energisation of both its windings in series and at contact *cd*1 short circuits its upper, low resistance, winding to delay its release, at contact *cd*2 connects a short circuit across the line wires connected to selectors and at contact *cd*3 operates relay CA. Contact *b*3 prepares an operating circuit for high speed relay AX, contact *b*5 closes a circuit over contacts *d*3, *am*5 and *br*2 for relay BF to operate it and contact *b*6 operates relays BA and CB. Relay CB at contact *cb*1 connects earth over contact *gs*2 to wire *p* outgoing from the banks of trunk selectors to guard the trunk. Relay BA at contact *ba*4 operates relay SP over its winding (III) and contact *z*5 but this operation is without useful effect at this time and contact *ba*5 closes an alternative holding circuit for relay CB. At the end of the pulse of X frequency current over the trunk contact *x*1 falls back and closes a circuit over contacts *br*1 and *b*1 for relay BR and a circuit over contact *b*3 and rectifier MR1 for high speed impulse repeating relay A. Relays CD and CA release and relay BR operates. During the slow release of relay CA resistance R6 is bridged across the two wires to the selectors. Contact *br*1 locks relay BR, contact *br*2 changes over to include contact *fl*1 of slow operating relay FL in the holding circuit of relay BF, contacts *br*3 and *br*4 extend the line wires toward the selector and contact *br*5 closes an operating circuit for relay Z over contact *y*1 of the relay Y in the voice frequency signal receiver responsive to current of Y frequency and contact *xa*4. Relay Z operates and at contact *z*1 opens a point in the operating circuit of relay RC and at contact *z*5 opens the circuit of winding (III) of relay SP releasing that relay. Consequent upon the release of relay SP and with contact *ca*1 back relay AX operates from earth over contacts *x*1, *b*3, *ca*1 and *sp*2 and at contacts *ax*1 and *ax*2 connects up the incoming trunk which is now terminated over condenser C3 and resistance R2. The trunk selector is now prepared for impulsing by the closure of a loop over contacts *br*4, left hand winding of retard coil RA, contact *hb*2, rectifier MR2, contact *hb*3, right hand winding of the coil RA, contacts *a*1 and *br*3 and the shunt over resistance R6 is disconnected. Impulses for the setting up of the connection are now received over the trunk as pulses of X frequency. These are responded to by relay X and repeated at contact *x*1 resulting in the release and re-operation at each pulse of relay A. Contact *a*1 which repeats the impulses to the selector is shunted over the spark quench combination comprising resistance R7 and condenser C4. On receipt of the first impulse, relays CD and CA are re-operated. Contact *cd*2 closes a low impedance impulsing loop to the selector and contact *a*1 repeats impulses to that selector. When earth is disconnected by contact *x*1 from relay A condenser C5 charges rapidly in series with relay A delaying the release of that relay by about 3 milli-seconds. Owing to the presence of rectifier MR1 however, relay AX releases very rapidly and splits the trunk circuit to prevent any D. C. surge from reaching the trunk and the voice frequency signal receiver. Operation of relay CA holds open the circuit of relay AX during the reception of an impulse train. At the end of the impulse train relays CD and CA release and the low impedance bridge across the line wires to the selector is opened at contact *cd*2. Relay AX re-operates on the closure of contact *ca*1. While relay CA remains operated it connects at contact *ca*2 an 800 ohm resistance R6 across the retard coil RA to maintain a satisfactory loop to the selector and to avoid any chance of the selector impulse receiving relay releasing when contact *cd*2 opens, relay CA being delayed in release and retard coil RA being of high impedance. Any further impulse trains are received and repeated in a similar manner. After the reception and repetition of an impulse train a busy condition may be encountered or it may be necessary to hold up further impulsing temporarily and after all the impulse trains have been received and the called line is found free the subscriber answers. All of these conditions are signified by a reversal of polarity of the line wires to the selector resulting in the operation of relay D by means of its winding (I). Contact *d*1 disconnects the termination comprising condenser C3 and resistance R2 from the trunk, contact *d*2 provides an additional holding circuit for relays A and AX and contact *d*3 opens to initiate the release of relay BF and operates relays TX and SP in series in a circuit from earth over contacts *b*5, *d*3, *am*4, *fl*2, *bf*4, relay TX, contacts *xa*6 and *g*4, winding (I) of relay SP to battery. Contact *sp*1 connects terminating resistance R2 across the trunk side of the condensers in the line circuit and contact *sp*2 releases relay AX to split the trunk and extend it to a source of X frequency current over back contacts *ty*3 and *ty*4 and front contacts *tx*3 and *tx*4, and X frequency current is reverted over the trunk. The duration of this reverted current depends on the signal received over the trunk selector, if it is a busy flash signal relay D will be flashed, operating for a period which may be set at .2 second and releasing for a period which may be set at .3 second. These timings are exemplary, they may be .5 second each, or any other suitable times not exceeding the release lag of relay BF which in the present example has been arranged to be about 900 milliseconds. Flashes of X frequency current will be transmitted over the trunk in synchronism with the flashing of relay D. If the signal is not a flash signal but a steady signal, operation of relay D will persist over the release period of relay BF. Relay BF will release if relay D remains operated for 900 milliseconds thereby determining that the signal is not a flash signal. Contact *bf*4 substitutes relay TY for relay TX so that Y frequency current is substituted for X frequency current over the line at contacts *ty*3 and *ty*4. At contact *bf*5, earth over contacts *ba*2 and *br*7 is connected to relay FL and also over winding (II) of relay D, contacts *d*4 and *br*6 to the winding (II) of relay SP, holding these two relays operated. This ensures that the signal is registered at the incoming end of the trunk as well as at the outgoing end (with respect to the direction of the call). Relay FL operates after a short delay and at contact *fl*1 re-operates relay BF over resistance R4, and at contact *fl*2 releases relay TY to terminate the pulse over the trunk. Re-operation of relay BF is delayed by the charging of condenser C6 in parallel with it over resistance R4. If no acknowledgment signal is to be received strap *b*, represented by a dotted line, will be in position, (Fig. 3), and closure of contact *fl*3 will extend earth over contact *an*3 to the left hand winding of relay AM. Relay AM operates and at contact *am*6 prepares a holding circuit for itself and an operating circuit for relay AN which become effective on the release of relay FL following the delayed operation of relay BF. Contact *am*2 opens in the operating circuit of relay CD, contact *am*4 prepares for the operation of relay TX on the eventual release of relay D and contact *am*5 provides for the holding of relay BF after the release of relay FL and while relay D remains operated. Operation of relay AN at this time is without useful effect. After the operation of relay BF relay D remains held by its winding (I) so long as the answer condition exists. Relay SP releases and operates relay AX at contact *sp*2 to connect up the trunk. The answering condition is thus established and the information locked up by the operation of relay AM. If the operation of relay AM had been brought about after the repetition of an impulse train other than that for setting the final selector to the contacts of the wanted line, the signal would be a "sending restraint" signal to hold up sending. Whichever signal it is it will only be removed and the information unlocked by the release of relay D. When this takes place contact *d*1 re-connects the termination comprising condenser C3 and resistance R2, contact *d*2 disconnects the additional holding earth for relay AX, contact *d*3 initiates the release of relay BF and operates relay TX and contact *d*4 connects earth over contacts *an*2 and *br*6 to winding (II) of relay SP. Relay SP operates, releases relay AX to split the trunk and connect up the source of X frequency current over operated contacts *tx*3 and *tx*4 to the trunk and a pulse of X frequency current followed by Y frequency current is transmitted over the trunk as previously described for the answer signal. Release of relay BF operates relay FL which at contact *fl*3 extends earth over contact *an*3 to energise the right hand winding of relay AN and over contact *am*1 to energise the right hand winding of relay AM which is wound in opposition to the left hand winding and relay AM is released. Contact *fl*1 re-operates relay BF. Upon the opening of contact *fl*3 consequent on the release of relay FL following re-operation of relay BF relay AN is released and the circuit assumes the pre-answered condition. The reverted signal allows sending to be resumed or a clearing signal to be given at the outgoing end of the trunk depending on the stage of the connection at which the information was locked up, i. e. whether it was in response to a "sending restraint" signal or an answer signal. If the reverted signal acts as a clearing signal release of the trunk will be initiated at the outgoing end and a clear forward signal given by a pulse of Y frequency current transmitted for from 2 to 2½ seconds. This pulse is long enough for relay B to be released. This is brought about as follows. Change over of contact *y*1 releases relay Z and operates relay G over contact *hb*4. Relay Z releases slowly as its lower winding is short circuited. Before relay Z releases relay ZR is operated over contacts *y*1, *hb*4, and *z*3. Contacts *z*2 and *g*1 have both been holding relay B and on the operation of relay ZR a further holding earth is applied over contact *zr*1 to maintain relay B after relay Z has released and relay G has operated until the subsequent release of relay ZR following the release of relay Z. This delay identifies the pulse as a signal. When relay ZR releases relay B will release after a short delay and relay AT will be operated from earth over contacts *y*1, *hb*4, z3, zr2, and at1 and will lock up over contacts at1 and g3. Earth over contacts ba3, g6, at3 and an3 energises the left hand winding of relay AM but this is without effect as the circuit is releasing. Contact at4 holds relays BA and CB. Contact z5 meanwhile operates relay SP over its winding (III) to release relay AX to split the trunk to guard against any interference with the clear forward signal. Relay B releases. Contact b1 releases relay BR, contact b2 opens the holding circuit for relay B, contact b3 releases relay A, contact b4 prepares for operation of relay TY, contact b5 opens a further point in the circuit for relay BF and contact b6 disconnects one holding earth for relays BA and CB. On the release of relay BR, contact br1 opens the holding circuit for that relay, contacts br3 and br4 open in the line wires to the selector, contact br5 guards relay Z against re-operation when the clear forward signal ceases and contact br6 opens in the circuit over winding (II) of relay SP. When the clear forward signal ceases, contact y1 falls back and releases relay G which in turn releases relay AT at contact g3 and at contact g6 allows relay AN to operate but without effect. Release of relay AT initiates release of relays BA and CB at contact at4. During the slow release of relay BA the following circuit is closed, earth over contacts y1, xa4, br5, gt3, ba1, b4, relay TY, contacts xa6 and g4, winding (I) of relay SP to battery. A pulse of Y frequency is reverted over the trunk as a release signal and is terminated by the release of relay BA which releases relay TY at contact ba1, relay SP at contacts ba1 and ba4 and relays AM and AN at contact ba3. Release of relay CB disconnects earth from the p wire of the trunk in the banks of trunk selectors at contact cb1 and restores the connection of battery to this wire at contact cb2 to mark the trunk free to trunk selectors.

The circuits illustrated also provide for the receipt of an acknowledgment signal following satisfactory transmission of answering and clearing signals. In this case strap b will not be in position and operation of relay AM will depend on operation of relay AT. The acknowledgment signal is a pulse of Y frequency received over the trunk. It will be remembered that operation of relay D on the answering of the call is followed by the release of relay BF and operation of relay FL. Operation of relay FL re-operates relay BF which in turn releases relay FL. During the release period of relay FL the acknowledgment signal, which is a pulse of Y frequency, should be received and receipt of the pulse causes earth to be extended over front contact y1 to relays G and ZR and brings about the delayed release of relay Z at back contact y1. Subsequent release of relay Z releases ZR and operates relay AT which locks up. These circuits have previously been described in connection with the receipt of a clear forward signal. Operation of relay AT operates relay AM over contacts ba3, g6, at3 and an3. At the end of the pulse, contact y1 falls back and releases relay G and re-operates relay Z. Release of relay G releases relay AT and the short circuit about the left hand winding of relay AN is removed and that relay operates in series with relay AM. The circuit is now in the same condition as it was after the transmission of the answering signal without acknowledgment. If no acknowledgment signal is received before relay FL is released following the reoperation of relay BF, relays TX and TY will be reoperated and another pulse of X frequency followed by a pulse of Y frequency will be reverted and these operations will continue until an acknowledgment is received. Similar operations will take place for a repeated clearing signal which needs to be acknowledged.

On an outgoing call the circuits illustrated operate in the following manner. The trunk tests free by reason of the battery connection over the resistance R8, contacts cb2, cb1, and gs2 to the test wire p in the banks of trunk selectors. As soon as the test relay in the trunk selector has operated, relay GS operates over its winding (I) in parallel with resistance R8 and locks to wire p over front contact gs2. Contact gs5 is an early closing contact and its closure connects earth over contact gt4 to winding (II) of relay GS, and to the left hand winding of relay GT and over rectifier MR4, relay TX, contacts xa6 and g4 and winding (I) of relay SP. Contact gs1 operates relay A, contact gs6 prepares a holding circuit for relay GT and contact gs7 disconnects magnet M from a source of earth pulses over wire EP. Relays SP and TX operate. Contact sp2 releases relay AX which operated momentarily on the closure of contact gs1 and which on release splits the trunk and connects it to a source of X frequency current over back contacts ax1, ax2, ty3 and ty4 and front contacts tx3 and tx4 and a pulse of X frequency current is transmitted over the trunk to take into use the terminal apparatus at the distant end. Contact sp1 connects terminating resistance R2 across the line wires on the trunk side of the line condensers. The pulse over the trunk is terminated by the operation of relay GT which takes place over the above described circuit after a delay period. Relay GT locks up in a circuit from earth over contact gt4, the right hand winding of the relay, contact gs6 resistance R9 to battery and opens the circuit for relays TX and SP releasing these relays. Contact gt1 disconnects condenser C3. When relay SP releases relay AX re-operates. Contact gt2 operates relay HB, contact gt3 closes an operating circuit for relay Z over contacts br5, xa4 and y1, contacts gt5 and gt6 close points in the pulse drive circuit of magnet M and contact gt7 operates relays BA and CB. Relay CB disconnects the resistance R8 from wire p at contact cb2. Relay BA at contact ba5 closes an alternative holding circuit for relay CB over its left hand winding. Relay HB on operation disconnects winding (I) of relay D from the line wires extending to the banks prepares a holding circuit for relay HB to be referred to later, and contact hb5 applies a further holding earth to the left hand winding of relay CB. Relay Z on operation opens a point in the operating circuit of relay RC at contct z1, contact z3 prepares an operating circuit for relay ZR and contact z5 opens the circuit over winding (III) of relay SP which would otherwise be closed on the closure of contact ba4. The circuits are now in a condition for the transmission of impulses over the trunk. For this purpose a sender in which the digits to be transmitted have been previously registered is connected to the trunk and in the sender earth is connected to wire N resulting in the operation of relay XX which at contact xx1 prevents the voice frequency impulses transmitted over the trunk from operating relay XA. The impulses for the setting up of the connection are transmitted from the sender as impulses of X frequency. Relay AX is held operated over contact gs1 and the voice frequency signal receiver remains connected to the trunk. Consequently contact x1 will be operated by relay X in the voice frequency receiver but the prior operation of relay XX will render operation of contact x1 ineffective. At the end of transmission of each impulse train relay XX will be released so that receipt of an X frequency signal may be rendered effective. If congestion is encountered at any stage in the setting up of the connection a busy flash signal will be received from the distant exchange. This signal consists of flashes of X frequency current as earlier mentioned. If for any reason it is necessary to hold up impulse transmission a steady signal of X frequency will be received and a similar signal will be received when the call is answered by the called subscriber. When a signal of X frequency is received over the trunk contact x1 will be operated and, relay XX being released, earth will be extended over contacts x1, hb1 and xx1 to relay XA and relay XA will be operated. Contact xa1 opens a further point in the pulse drive circuit of magnet M, contact xa2 closes a circuit over contact br2 for operating relay BF, contact xa3 earths wire S connected to the banks of trunk selectors to stop the transmission of impulses by the sender, contact *xa*4 releases relay Z which now releases quickly as the short circuit across its lower winding is removed at contact *xa*5 and contact *xa*7 holds relay GT should the caller clear during receipt of an X frequency signal to permit a clear forward signal to be transmitted. Contact *z*1 falling back connects up relay RC which operates slowly in parallel with relay XA and contact *z*5 operates relay SP by means of its winding (III) which in turn releases relay AX to split the trunk. If the signal persists over the release period of relay Z and operation of relay SP, which is about 50 milliseconds, it is identified as a signal and not a transient and after the expiry of this period relay RC will operate and lock up over contacts *rc*1 and *bf*1. If the signal is a flash signal, relay XA will respond to the flashes and during the period when relay X is not operated relay XA will release and re-operate relay Z. Relay SP continues to be held during these periods by means of the energization of its winding (III) over contacts *ba*2, *bf*5, *rc*2 and *an*4. Relay BF will hold due to the connection of the large condenser C6 and resistance R5 and variable resistance R3 in parallel with it, for a period of about 900 milliseconds. The second operation of relay XA and the earthing of wire S causes the sender to be disconnected and wires to be extended to the operator's position at which the supervisory lamp will be flashed. After about 900 ms. following the termination of the X frequency pulse relay BF releases and at contact *bf*1 unlocks relay RC which releases relay SP at contact *rc*2 to re-operate relay AX at contact *sp*2. Impulse transmission can now proceed if necessary. If the X frequency pulse persists and is followed by a Y frequency pulse the signal will be recognised as a steady signal. The operations in response to the X frequency signal are as described above. Receipt of the pulse of Y frequency operates contact *y*1 which prevents re-operation of relay Z and operates relays G and AT. Relay G at contact *g*2 short circuits its lower winding to make it slow to release, at contact *g*3 prepares a locking circuit for relay AT, at contact *g*4 opens a point in the circuit of winding (I) of relay SP, at contact *g*5 closes a holding circuit for relay GT independently of relay GS and at contact *g*6 prepares an operating circuit for relay AM. Relay AT at contact *at*3 completes the circuit over contacts *ba*3, *g*6 and *an*3 for relay AM which operates and prepares a holding circuit for itself and an operating circuit for relay AN at contact *am*6. Contact *am*3 dims the supervisory lamp by earthing wire S and the signal is locked up. At the end of the pulse of Y frequency, contact *y*1 releases relay G which in turn releases relay AT at contact *g*3 and the short circuit across the left hand winding of relay AN being removed by the release of relays G and AT, relay AN operates in series with relay AM. Contact *an*3 prepares a releasing circuit for relay AM which is differentially wound and contact *an*4 opens in a circuit for winding (III) of relay SP to guard against its operation on a subsequent pulse of X frequency. Contact *an*1 short circuits the lower winding of relay Z to delay its release on receipt of a subsequent pulse of Y frequency. Meanwhile relay Z has re-operated and at contact *z*5 opened the other circuit for winding (III) of relay SP. Relay SP being now released, contact *sp*2 re-operates relay AX to switch the trunk through.

The clearing signal is similar to the answer signal and results in the operation of relays G and AT. Closure of contacts *at*3 and *g*6 holds relay AN and by energizing the right hand winding of relay AM releases that relay by differential action. At the end of the signal and release of contact *y*1, relays G, AT and AN release and relay Z re-operates. Release of relay AM causes the supervisory lamp to light.

When the operator clears down the connection, earth is removed from wire *p* and relay GS releases. Contact *gs*1 releases relays A and AX, contact *gs*2 disconnects relay GS from wire *p* and connects earth over contact *cb*1 to that wire to mark the trunk engaged until all the terminal apparatus has been restored to normal. Contact *gs*6 changes over the holding circuit for relay GT to one from earth over contact *gt*4, its right hand winding, contact *gs*6, wiper M1, contact *b*4, relay TY, contacts *xa*6 and *g*4 and winding (I) of relay SP and contact *gs*7 connects wire EP over contacts *xa*1, *zr*3, *gt*6, *gt*5, normal contact and wiper M2 to magnet M of the stepping switch which is stepped by ½ second pulses over wire EP to its 5th position, then by self interruption at contacts *m* to its 8th position. During the stepping of the switch Y frequency current as a clear forward signal is transmitted over the trunk by the operation of relay TY. In the 8th position of wiper M1 relays TY and SP are released and the pulse over the trunk is terminated. During the stepping of the switch to its 10th position by pulses over wire EP a release signal should be received. This consists of a long pulse of Y frequency. By the changing over of contact *y*1 relay Z is released and relay HB is held over contact *hb*4. In positions 9 and 10 of wiper M1 relay GT was held over contact *gs*6, wiper M1, contact *z*4 and resistance R9 and when relay Z releases the circuit for relay GT is opened and that relay releases. Stepping of the switch to normal after the release of relay GT is by self-interruption over contact *m* and back contact *gt*6. Release of relay GT reconnects the termination consisting of condenser C3 and relay R2 at contact *gt*1, opens one holding circuit for relay HB at contact *gt*2, disconnects relay Z at contact *gt*3, opens its own locking circuit at contact *gt*4, disconnects the pulsing circuit from the arc of wiper M2 at contacts *gt*5 and *gt*6 and initiates release of relay BA at contact *gt*7. When relay BA releases it disconnects a possible circuit over contact *y*1 for relays TY and SP (winding (I)) at contact *ba*1, opens a possible circuit for winding (III) of relay SP at contact *ba*4 and removes one holding earth from relay CB at contact *ba*5. At the end of the release signal, contact *y*1 falls back and releases relay HB which in turn releases relay CB at contact *hb*5. Release of relay CB disconnects earth from wire *p* and re-connects battery over resistance R8 to that wire. If the clear forward signal did not register at the distant end of the trunk, the release signal will not be received while the switch is stepping from position 8 to position 10 and in position 10 relay TY will re-operate and relay GT will remain held and a long pulse of Y frequency of about 6 seconds' duration will be transmitted over the trunk during the pulsed stepping of the switch to its 23rd position in which position relay GT is held over contact *z*4. If a release signal is now received Z releases and the circuits are restored to normal as above described. If no release signal is received, the switch will be stepped by the next earth pulse over wire EP to position 24 in which the circuit for relay GT will be opened and that relay released. The switch is stepped by self-interruption to normal and relay Z is released at contact *gt*3.

The circuits can also respond to answer and clearing signals consisting of repeated pulses of Y frequency and transmit an acknowledgment signal. When the connection has been set up it will be remembered that the following relays are in an operated condition: A, AX, GS, GT, HB, Z, BA and CB. When the first pulse of Y frequency is received relays G and ZR operate and relay Z is released. On the release of relay Z the circuit of relay ZR is opened and that relay will release after an interval. If the pulse continues over the releasing period of relay ZR which is a guard period, the signal is registered by the operation of relay AT and the operation or release of relay AM as the case may be. At the end of the pulse relays G and AT release and relay AN operates in series with relay AM or releases as the case may be and relay Z reoperates. For circuits required to transmit acknowledgment signals strap *a* (Fig. 2) will be in position. When contact *y*1 falls back and following the release of relay G, earth over contacts *gs*4, strap *a*, contacts *at*2 and *b*4, relay TY, contacts *xa*6 and *g*4 operates relay SP (winding (I)). The trunk is split, relay AX is released and a pulse of Y frequency is transmitted over the trunk, the pulse being terminated by the release of relay AT.

What is claimed is:

1. In a telephone system a trunk line, terminal equipment at each end of said trunk line, an outgoing circuit connected to one of said terminal equipments, means at said one terminal equipment responsive to a change of condition of said outgoing circuit for transmitting a supervisory signal over said trunk line, further means at said one terminal equipment operative on the persistence of said changed condition for changing the character of said supervisory signal, an indicating circuit at the other terminal equipment, means at said other terminal equipment responsive to said supervisory signal of original character to give an indication in said indicating circuit and further means responsive to said supervisory signal of changed character to lock said indicating circuit to maintain the indication.

2. In a telephone system according to claim 1 means at said one terminal equipment responsive to a change of condition of said outgoing circuit to transmit a signal of one frequency over the trunk and means operative if said changed condition persists to change the frequency of the signal and transmit said signal of changed frequency over the trunk, means at the other terminal equipment responsive to receipt of the signal of said one frequency to prepare a circuit for operation on receipt of said signal of changed frequency, means responsive to receipt of said signal of changed frequency to complete the prepared circuit and further means operative on the termination of said signal of changed frequency to lock said completed circuit.

3. In a telephone system a trunk line, terminal equipment at each end of the trunk line, a line connected to one of said terminal equipments, means at said one terminal equipment responsive to a change of condition of said line for transmitting a supervisory signal over the trunk line, a timing device in said one terminal equipment started into operation by operation of said means, said timing device if said changed condition persists completing its timing operation to change the character of said supervisory signal for a timed period, means at the other terminal equipment responsive to said signal of original character, an indicating circuit closed by said latter means to give an indication of said changed condition, further means at said other terminal equipment responsive to receipt of said signal of changed character and a circuit closed by said further means at the end of said time period to lock said indicating circuit to maintain the indication.

4. In a telephone system a trunk line, terminal equipment at each end of the trunk line, a line connected to one of said terminal equipments, means at said one terminal equipment responsive to a change of condition of said line for transmitting a supervisory signal over the trunk line, said supervisory signal comprising a prefix part and a significant part, a timing device in said one terminal equipment started in its timing operation by operation of said means and if said changed condition persists for the whole timing operation to change the character of said signal for a timed period, an indicating circuit at the other terminal equipment for giving an indication of said changed condition, a splitting relay for splitting the trunk line at said other terminal equipment, a timing device for timing the duration of the prefix part of a received supervisory signal and on the completion of this part to maintain the splitting relay operated until the end of said timed period, a reversion of said changed line condition without change of character of the supervisory signal opening said indicating circuit and re-setting the timing devices and a subsequent change of the line condition transmitting a further supervisory signal.

5. In a telephone system a trunk line, like terminal equipment at each end of the trunk line, an outgoing selector with bank contacts connected to the terminal equipment, an incoming selector connected to the terminal equipment, said terminal equipment including means responsive to its seizure by the outgoing selector to seize the trunk line and to prepare the equipment for the reception of supervisory signals over the trunk line, means responsive to a seizing signal over the trunk line to extend the trunk to the incoming selector and to prepare the equipment for the reception of impulses over the trunk and repeating them to said incoming selector, a line connected to said incoming selector, means in the terminal equipment responsive to a change of condition of said line when connected by the incoming selector to said terminal equipment to transmit a supervisory signal over the trunk line and means operative if said change of condition persists to change the character of said signal for a timed period, an indicating circuit connected over said outgoing selector, means responsive to receipt of said signal of original character to give an indication in said indicating circuit and further means responsive to said signal of changed character to lock said indicating circuit to maintain said indication after the end of said timed period.

References Cited in the file of this patent

UNITED STATES PATENTS

| | | |
|---|---|---|
| 2,260,318 | Hecht | Oct. 28, 1941 |
| 2,375,053 | Vaughn | May 1, 1945 |
| 2,424,577 | Mauge | July 29, 1947 |
| 2,594,719 | Beale | Apr. 29, 1952 |
| 2,642,500 | Fritachi et al. | June 16, 1953 |